US006412112B1

(12) United States Patent
Barrett et al.

(10) Patent No.: US 6,412,112 B1
(45) Date of Patent: Jun. 25, 2002

(54) SYSTEM FOR TRANSMITTING DIGITAL DATA THROUGH A LOSSY CHANNEL

(75) Inventors: Peter T. Barrett, San Francisco; Steven C. Wasserman; Stephen G. Perlman, both of Mountain View, all of CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/246,275

(22) Filed: Feb. 8, 1999

Related U.S. Application Data

(63) Continuation-in-part of application No. 09/107,267, filed on Jun. 30, 1998.

(51) Int. Cl.[7] .......................... H04N 7/16; H04N 5/445
(52) U.S. Cl. .......................... 725/152; 725/54; 725/143
(58) Field of Search .......................... 709/717; 348/327, 348/13, 12, 20, 6, 906, 468; 455/5.1, 6.1, 6.2, 6.3, 3.1, 3.2; 725/63, 64, 67, 148, 143, 151, 152, 39, 54; 209/717; 345/329; 375/240.01, 240.12

(56) References Cited

U.S. PATENT DOCUMENTS

| 5,657,072 A | * | 8/1997 | Aristides et al. ............... 348/13 |
| RE35,774 E | | 4/1998 | Moura et al. |
| 5,801,778 A | * | 9/1998 | Ju ............................... 348/416 |
| 5,822,123 A | * | 10/1998 | Davis et al. ................. 348/564 |
| 5,847,762 A | | 12/1998 | Canfield et al. ............. 348/415 |
| 5,878,041 A | * | 3/1999 | Yamanaka et al. ........... 370/394 |
| 5,915,027 A | * | 6/1999 | Cox et al. ...................... 380/54 |
| 5,929,850 A | * | 7/1999 | Broadwin et al. ........... 345/327 |
| 5,961,603 A | * | 10/1999 | Kunkel et al. .............. 709/229 |
| 5,991,799 A | * | 11/1999 | Yen et al. .................... 345/327 |
| 6,002,394 A | * | 12/1999 | Schein et al. ................ 345/327 |
| 6,005,561 A | * | 12/1999 | Hawkins et al. ............. 345/327 |

OTHER PUBLICATIONS

International Publication No.: WO96/17292 dated Jun. 6, 1996, of International Application No.: PCT/US95/15719.

* cited by examiner

Primary Examiner—Andrew Faile
Assistant Examiner—Vivek Srivastava
(74) Attorney, Agent, or Firm—Workman, Nydegger & Seeley

(57) ABSTRACT

A system for distributing digital data over a video channel to a plurality of remotely located client terminals. The system involves selecting a set of digital data to be distributed and converting it to an intermediate format compatible with video broadcast. The intermediate data is then broadcast over a video channel during a time when no video content is being transmitted so that the intermediate format data takes the place of the video content. The intermediate format data is received at a remotely located client terminal where the set of digital data is recovered.

23 Claims, 8 Drawing Sheets

```
 0   1   5   6  14  15  27  28
 2   4   7  13  16  26  29  42
 3   8  12  17  25  30  41  43
 9  11  18  24  31  40  44  53
10  19  23  32  39  45  52  54
20  22  33  38  46  51  55  60
21  34  37  47  50  56  59  61
35  36  48  49  57  58  62  63
```

SYSTEM FOR TRANSMITTING DIGITAL DATA THROUGH A LOSSY CHANNEL

CROSS-REFERENCE TO RELATED APPLICATION

This application is a continuation-in-part of U.S. patent application Ser. No. 09/107,267, filed Jun. 30, 1998, which is hereby incorporated by reference.

TECHNICAL FIELD

The present invention relates to transmission of digital data and more particularly to a system for reliably sending digital data over a channel where the signal may be subject to degradation during transmission.

BACKGROUND OF THE INVENTION

Moving data from place to place electronically has become a vast enterprise in modern society. Telephones are used to transport voice signals between callers. Facsimile machines are employed to send documents to remote sites. Computers exchange digital data over modems. Radio signals broadcast audio programming to listeners. Television transmissions convey video signals to viewers in almost every home.

A variety of mechanisms or channels are available to send the different types of data. For instance, telephone calls, facsimile transmissions and modem transfers of digital data all can be completed over plain old telephone service (POTS) lines. Radio and television broadcasts are normally broadcast from transmission towers and satellites and sent over cable systems. With each of these channels, the data carrying capacity, or bandwidth, is governed by the nature of the data normally sent over the channel. Thus, POTS, being adapted to transmit voice data, has a relatively low bandwidth while typical television broadcast channels have relatively high bandwidth in order to convey the high volume of data inherent in a video signal.

In addition to considerations of bandwidth, the type of data that can be transmitted over a given channel is governed by whether or not the channel is bi-directional. Of the three main data transmission systems found in most residences—telephone, radio frequency broadcast and cable—only telephone is inherently bi-directional. Thus, although other technologies are being developed, the telephone has been the channel of choice when data must be transmitted bi-directionally to and from a residence.

With the advent of the Internet, there has been explosive growth in the number of people that use their phone lines to access digital data from resources available on line. These resources include World Wide Web pages providing access to various types of digital data, such as still images and audio and video content. In some cases, the amount of data to be transferred challenges the bandwidth available on phone lines. In other cases, so many users are accessing the same data, that the separate repetitive transfer of the data to each of the users independently is inefficient.

One system in which both the bandwidth and repetitive transfer issues arise is the WEBTV® Internet access network. (WEBTV is a registered trademark of WebTV Networks, Inc. of Mountain View, Calif.) The WEBTV Internet access network includes a large number of Internet terminals, also referred to as client terminals, and at least one Internet Server. While the client terminals can access the Internet directly under some circumstances, the server provides a convenient standardized interface to facilitate access of the Internet by the client terminal. The server also offers supplemental services, such as email, news reports, television program guides and enhanced access to certain Web pages. In the course of carrying out these supplemental services, substantial quantities of individualized or private data, and broadly applicable or public data, must be downloaded to the client terminals.

With the current WEBTV system, supplemental services data is downloaded in advance during low-use periods to the extent possible. For instance, WEBTV client terminals are configured to automatically call into the server during the night to check for email and receive other information. However, because this process must be individually repeated for each client terminal, substantial telephone costs may be incurred. In addition, in some cases the quantity of data to be retrieved is so large that long periods of time are required to complete the download.

SUMMARY OF THE INVENTION

The present invention includes a system for distributing digital data over a video channel to a plurality of remotely located clients, such as WEBTV client terminals. The system involves selecting a set of digital data to be distributed, for instance, client terminal software updates or electronic programming guides, and converting the data to an intermediate format compatible with video broadcast. The intermediate data is then broadcast over a video channel during a time when no video content is being transmitted so that the intermediate format data takes the place of the video content. The intermediate format data is received at a remotely located client terminal where the set of digital data is recovered.

DETAILED DESCRIPTION OF THE INVENTION

Figure 1:
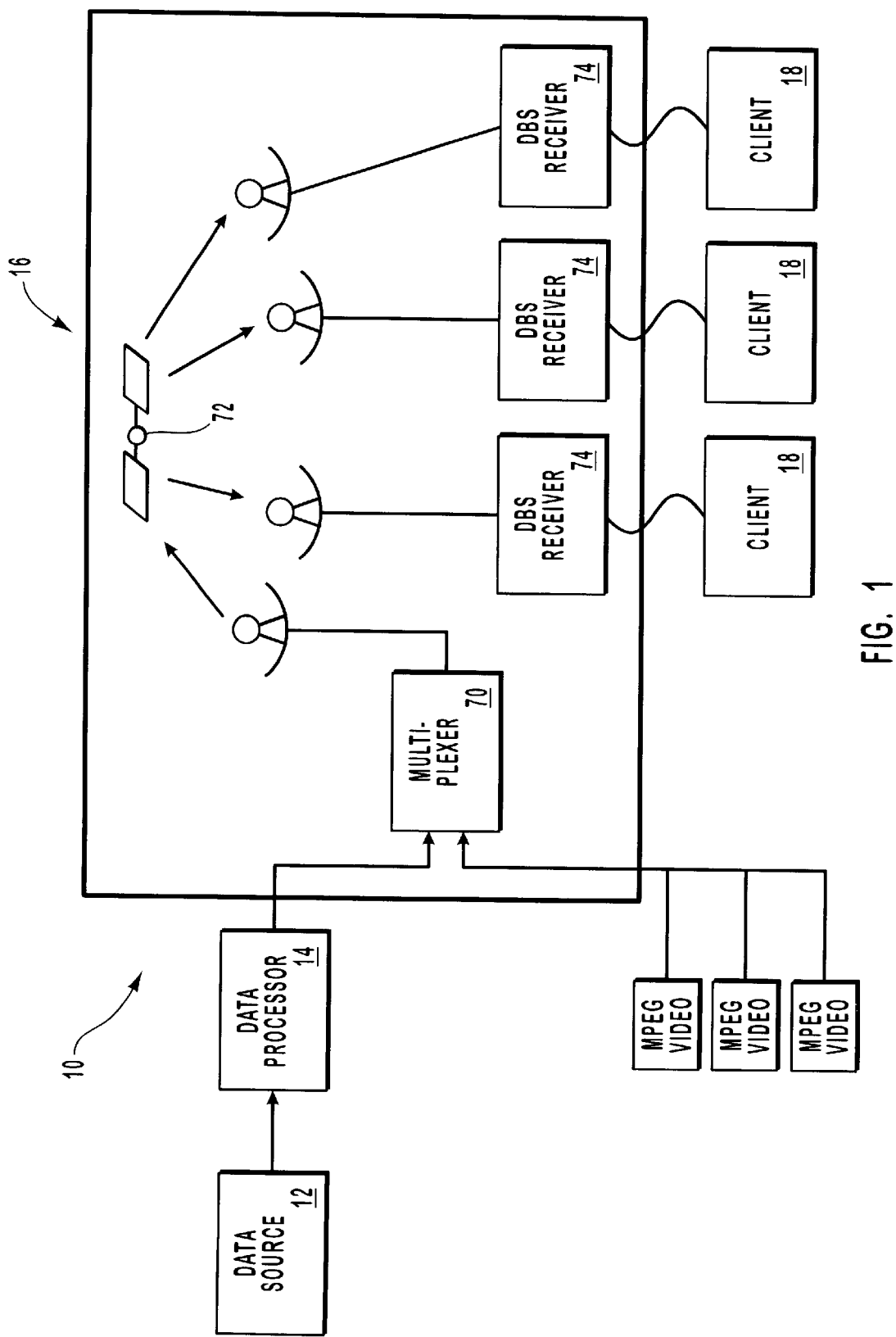
FIG. 1 is a schematic view of a system for distributing digital data constructed according to the present invention.

A system for distributing computer data to a plurality of remote locations according to the present invention is shown generally at 10 in FIG. 1. System 10 includes a data source 12 from which digital data originates, a data processor 14 which acts on the digital data to convert it to an intermediate format for transmission, a video broadcast system 16 to receive data in the intermediate format and convey it to client terminals 18 where the data is restored to its original digital form.

Figure 2:
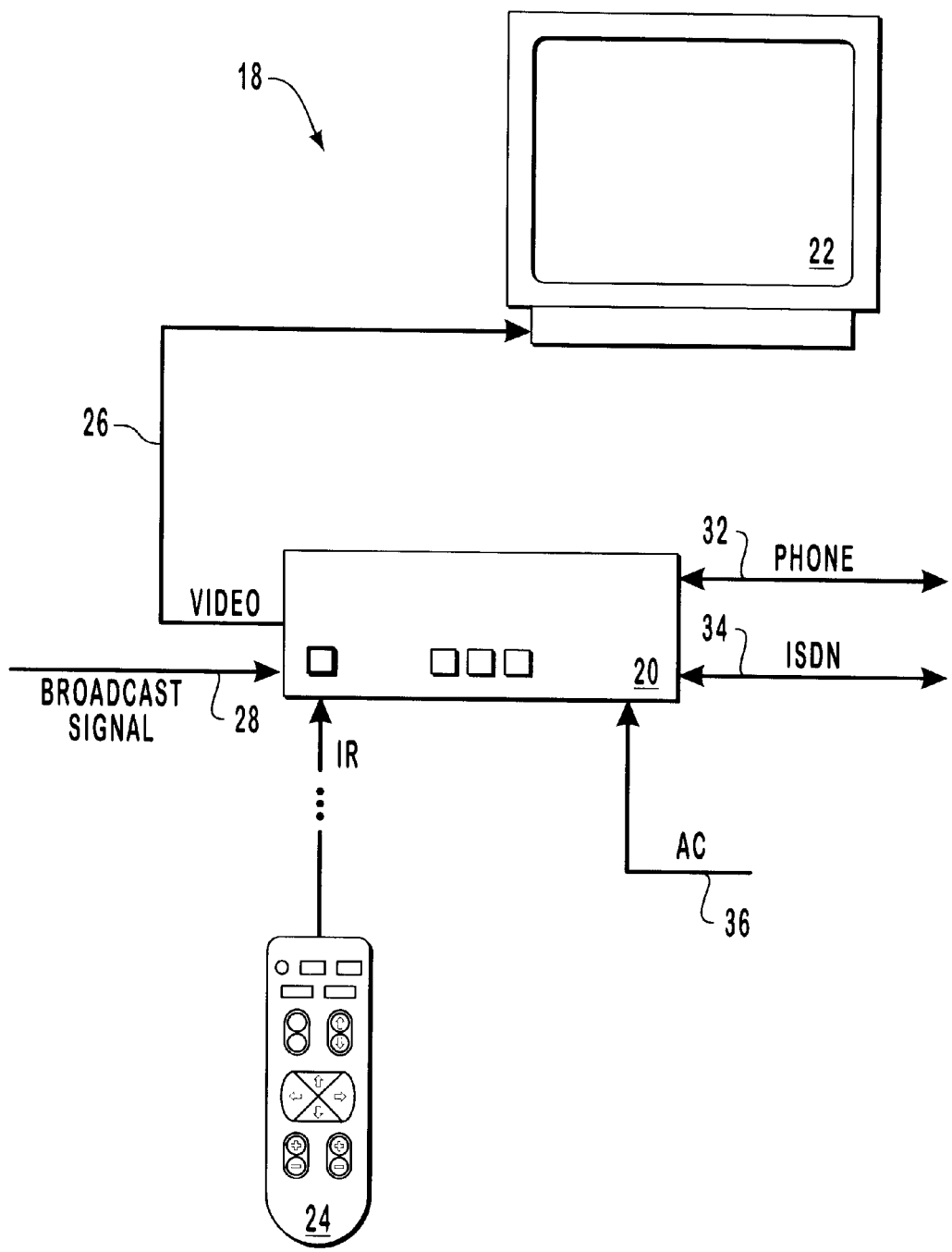
FIG. 2 is a schematic view of a client terminal configured for use as part of the present invention.

In the disclosed embodiment, client terminals 18 are preferably but not necessarily WEBTV Internet terminals. As shown in FIG. 2, each terminal includes an electronics unit 20 (hereinafter referred to as "the set-top box" 20 because it is often positioned on the top of a television set), a television set 22, and a remote control 24. In an alternative embodiment of the present invention, set-top box 20 is built into television set 22 as an integral unit. In the embodiment depicted, the client terminal uses television set 22 as a display device for displaying both video data and a graphical user interface. The set-top box is coupled to the television set by a video link 26. The video link is an RF (radio frequency), S-video, composite video, or other equivalent form of video link.

The set-top box includes hardware and/or software for receiving and decoding a broadcast video signal 28, such as an NTSC, PAL, SECAM or other TV system video signal, and providing video data to the television set via video link 26. Set-top box 20 also includes hardware and/or software to cause a graphical user interface to be displayed on television 22, by which the user can access various Internet system network services, browse the Web, send email, and otherwise access the Internet.

Client terminal 18 may include both a standard modem and an ISDN modem (See FIG. 3), such that the communication link between set-top box 20 and the Internet can be either a telephone (POTS) connection 32 or an ISDN (Integrated Services Digital Network) connection 34. The set-top box receives power through a power line 36.

Remote control 24 is operated by the user to control the client terminal while browsing the Web, sending email, and performing other Internet-related functions, as well as to control television viewing. The set-top box receives commands from remote control 24 via an infrared (IR) communication link. In alternative embodiments, the link between the remote control and the set-top box may be RF or any equivalent mode of transmission, such as by wires, etc.

Figure 3:
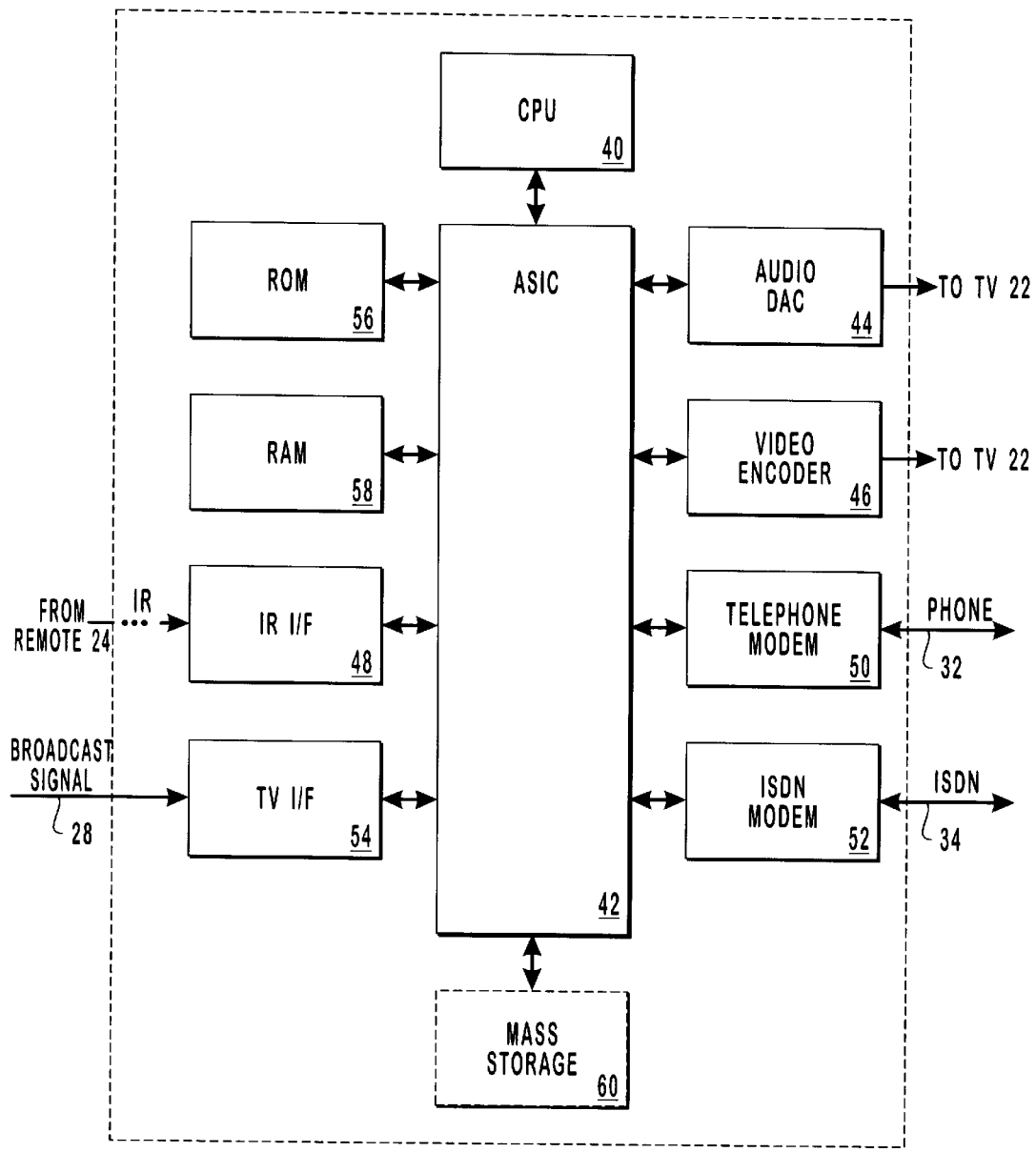
FIG. 3 is a schematic view of the architecture of the client terminal of FIG. 2.

FIG. 3 is a block diagram illustrating internal features of set-top box 20. In this example, operation of the client terminal is controlled by a processing unit, such as central processing unit (CPU) 40, which is coupled to an Application-Specific Integrated Circuit (ASIC) 42. The CPU executes software designed to implement various features of the present invention. ASIC 42 contains circuitry which may be used to implement certain features. ASIC 42 is coupled to an audio digital-to-analog converter (DAC) 44 which provides audio output to television 22. In addition, ASIC 42 is coupled to a video encoder 46 which provides video output to television set 22. An IR interface 48 detects IR signals transmitted by remote control 24 and, in response, provides corresponding electrical signals to ASIC 42. A standard telephone modem 50 and/or an ISDN modem 52 are/is coupled to ASIC 42 to provide connections 32 and 34 with access to the Internet. Note that the set-top box also may include a cable television or radio frequency modem (not shown).

A TV interface 54 is coupled to ASIC 42 to receive broadcast video signals, such as an NTSC video signal, and provide corresponding electrical signals to ASIC 42, thereby allowing video data carried in broadcast video signal 28 to be presented to the viewer on television 22. More specifically, TV interface 54 is configured to digitize the incoming video signal, which is stored in RAM 58, so that ASIC 42 and CPU 40 can process the video signal before displaying it on the television. The configuration enables the set-top box, for instance, to generate shared screen viewing where the video signal only occupies a portion of the screen. The remaining screen area can then be used to display various user interface controls or data, such as video programming information. The ability to digitize incoming video signals is utilized in the described embodiment of the present invention, as will be described in detail below.

Also coupled to ASIC 42 is read-only memory (ROM) 56, which provides storage of program code for implementing application software to be executed by the set-top box. Note that ROM 56 may be a programmable ROM (PROM) or any form of erasable PROM (EPROM) or flash memory. A mass storage device 60 may optionally be provided and coupled to ASIC 42. The mass storage device may be used to input software or data to the client terminal or to store downloaded software or data. Mass storage device 60 can be any suitable medium for storing machine-executable instructions, such as magnetic disks, optical disks, and the like.

Figure 4:
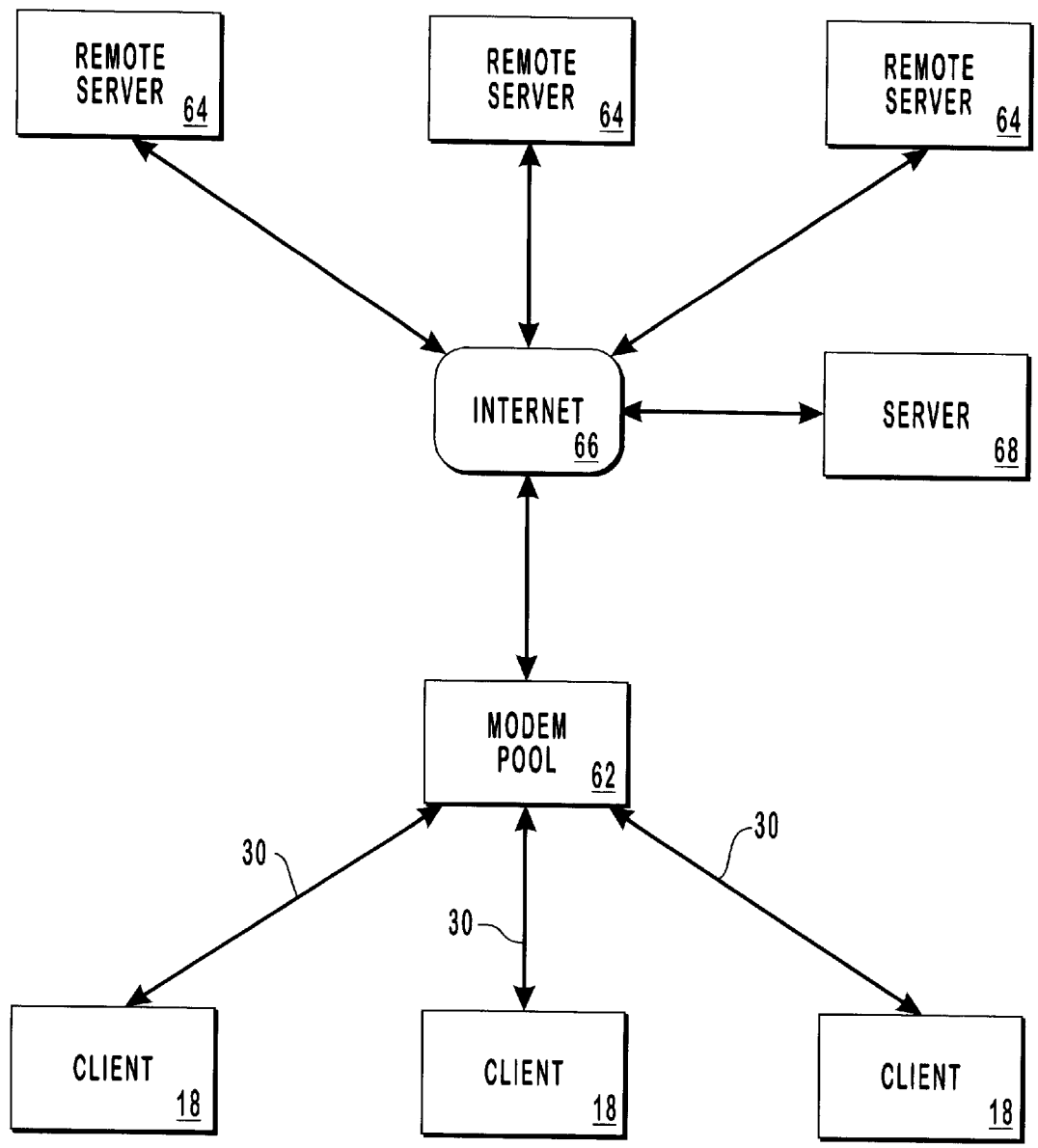
FIG. 4 is a schematic view of the structure of a network for use by client terminals as shown in FIG. 2.

FIG. 4 illustrates a basic configuration of the Internet system network in which the client terminal operates. A number of client terminals 18 are coupled to a modem pool 62 via direct-dial, bi-directional data connections 30, which may be telephone connection 32, ISDN connection 34, or any other similar type of connection, such as cable and satellite forward channels. In any event, the modem pool 62 is coupled typically through a router to a number of remote servers 64 via a network infrastructure 66, such as the Internet. The Internet system also includes a WEBTV network server 68, which specifically supports client terminals 18. The client terminals each have a connection to server 68 through modem pool 62 and the Internet.

As described generally above, various types of information are delivered from the Internet or WEBTV server 68 in connection with supplemental services provided as part of the WEBTV network. For instance, the text of email must be downloaded to the set-top box for reading by the user. Another supplemental service provided by the WEBTV network is a television programming guide which contains television program schedules. Certain commonly accessed web sites may be downloaded to the set-top box in advance to improve the response time for users accessing these sites. Advertisements that are to be displayed during use of the set-top box can be downloaded during periods of inactivity to avoid the delay that might occur if the ads had to be downloaded as they were to be displayed. Client terminal operating software updates can also be delivered in a similar fashion. Other special or general interest material can be downloaded during periods of disuse to maximize the utility of the client terminal to the user. In the past, the data corresponding to each of these types of supplemental services has been downloaded over the telephone or ISDN connections. Unfortunately, using this method, information must be delivered to each set-top box separately and at the relatively low bandwidth available over phone lines.

The disclosed embodiment of the present invention, as depicted in FIG. 1, overcomes the bandwidth and separate download problems inherent in the existing network by transmitting certain types of data through the video broadcast system, which has a high bandwidth and broad dissemination. For example, the disclosed embodiment involves taking digital data from source 12 and converting it to an intermediate form compatible with video transmission at processor 14. This video-format data is then transmitted over video broadcast system 16, which may be cable, radio-frequency broadcast or digital satellite based, to numerous client terminals 18. The client terminals receive and decode the video-format data to retrieve the original data. It should be noted that the video-format data is not piggybacked onto a video signal, but rather substitutes for or replaces the video content in a particular video channel. Using this system for data distribution allows a large quantity of data to be transmitted to a plurality of remote client terminals simultaneously. Although in principle it might be possible to broadcast virtually all data to the client terminals over a broadcast channel, in practice it is preferred to select only those types of data which are particularly well-suited to broadcast distribution by virtue of the broad applicability or quantity of the data.

While the invention may be practiced in the above-described form, the invention may further include elements that facilitate efficient and reliable transmission over broadcast networks. In particular, most video broadcast systems rely on digital satellite channels to convey signals from the network to local broadcast stations or from the network to the end user in the case of digital satellite systems, such as depicted in FIG. 1. With reference to the described embodiment, broadcast system 16 of FIG. 1 includes an uplink multiplexer 70 which receives digital data from a number of sources, generally corresponding to different television channels, as well as data processor 14. The multiplexer combines the digital data for transmission to a satellite 72, from which the signal is broadcast to a large number of digital broadcast satellite receivers 74. The receivers convert the digital broadcast from the satellite back into analog video format for delivery to a television, or in the case of the disclosed embodiment, to a client terminal.

Digital satellite transmissions utilize a so-called "lossy" form of compression known as MPEG to achieve maximum channel capacity. MPEG is known as a lossy compression technique because data sent through an MPEG-compressed channel is subject to degradation, i.e. some data is lost. While such degradation is designed to be undetectable by television viewers, it is a major impediment to sending digital data embedded in a video signal because loss of even one bit of digital data can make an entire downloaded block of data useless.

In order to most efficiently overcome the problem of data loss inherent in MPEG compression, the present embodiment provides a system for encoding data directly into an MPEG format as the intermediate format. The disclosed system makes use of the fact that MPEG decompression is deterministic, that is, a given MPEG data stream will always generate the same output. This is in contrast to the MPEG compression step, where different MPEG compressors will generate different MPEG data streams. By encoding the MPEG data stream directly, past the point where lossy compression occurs, it is possible to create an MPEG data stream that will generate an exact, known output. The encoding process can thus be set up to generate a video output from which the original data can be reliably extracted, as described in detail below.

MPEG is a frequency domain compression algorithm developed to generate a compact digital representation of video signals and is described in the book *MPEG Video Compression Standard*, edited by Joan Mitchell, William Pennebaker, Chad Fogg and Didier LeGall, published Chapman & Hall, 1997, which is incorporated herein by reference. "MPEG" as used herein, shall include MPEG I or II, or subsequent standards that rely on similar compression principles.

Figure 5:
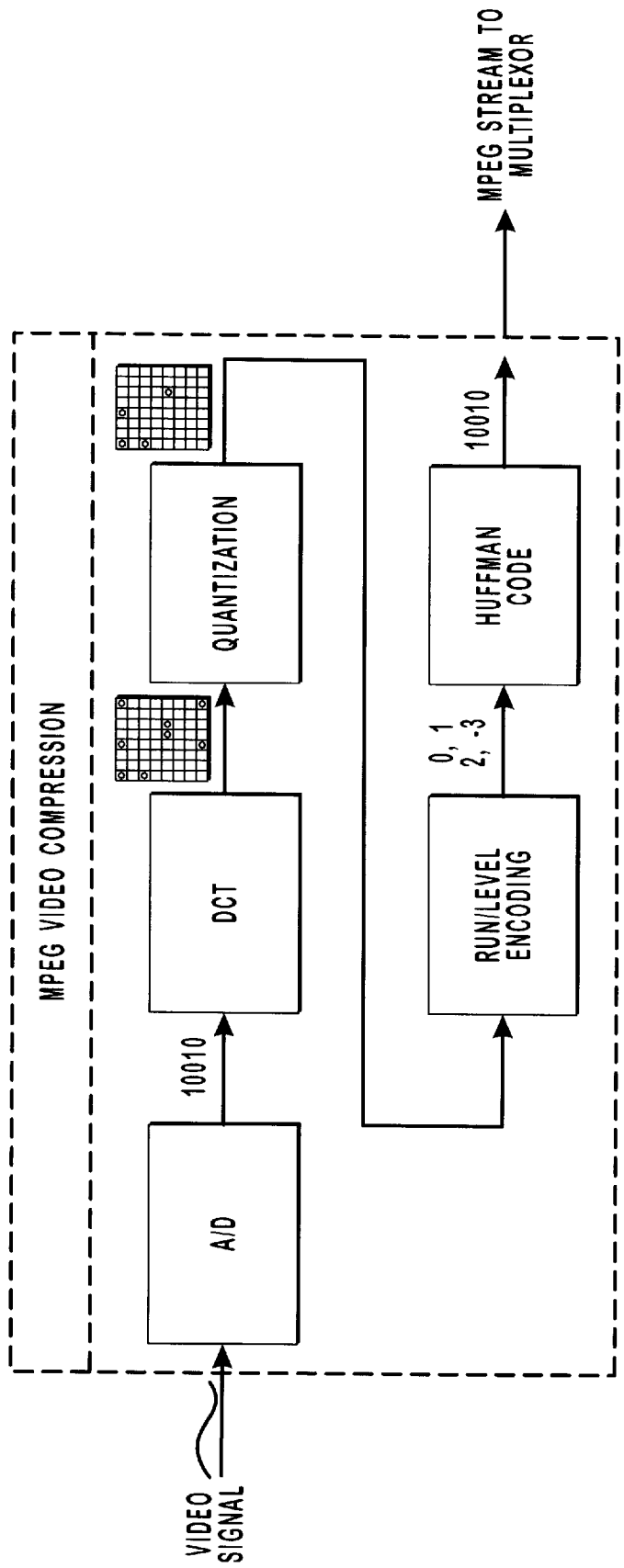
FIG. 5 is a flowchart showing steps of MPEG compression.
Figures 6, 7:
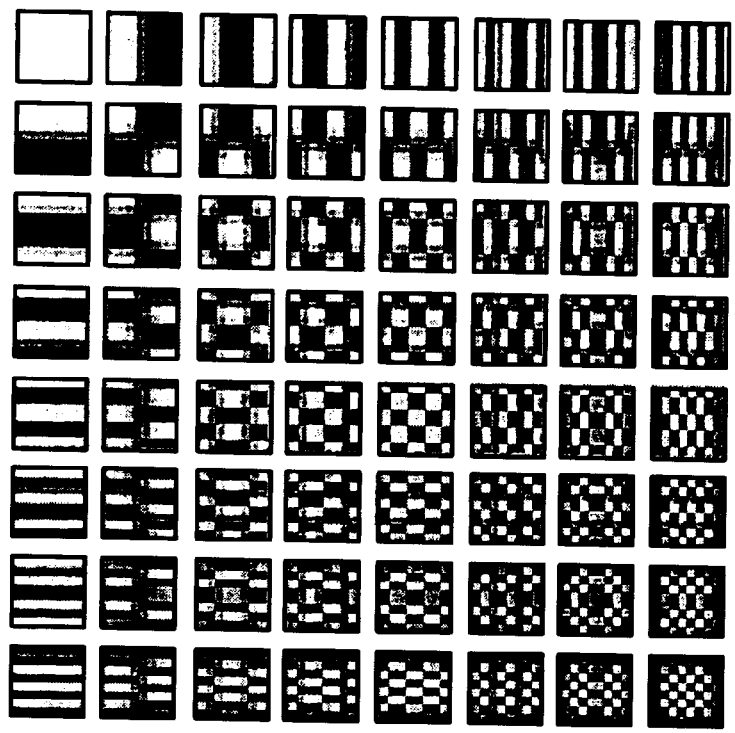
FIG. 6 illustrates basis functions utilized in a discrete cosine transformation in MPEG compression.
FIG. 7 illustrates the coding order in MPEG compression of the various frequency components shown in FIG. 6.

MPEG compression is depicted schematically in FIG. 5, and operates on 8×8 blocks of pixel luminance (greyscale) and chrominance (color) values. After digitization of the video signal, a mathematical operation known as a discrete cosine transform (DCT) is carried out on each block of pixels to extract spatial frequency coefficients from the blocks. More particularly, the DCT generates a coefficient level for each of the 64 total frequency coefficients or components which form the basis functions for the DCT. These basis functions are illustrated in FIG. 6. It can be seen that the upper left corner represents a DC offset or zero frequency value with no spatial variation. Thus, a block of pixels of constant value would result in a DCT with the DC value being the only non-zero component. Similarly, a block of pixels with values that alternated sign each pixel would have a non-zero component only for the lower right function in FIG. 6. Pixel blocks with more complex patterns will have various component values for the different basis functions. The output data of the DCT step, i.e. the 8×8 matrix of frequency component values, is indicated schematically between the DCT and Quantization blocks. The output of the subsequent steps is similarly represented.

It turns out that most video images do not generate many high frequency components with large values in the DCT. Moreover, the human visual system is not as sensitive to these high frequency components. As a result, many of the high frequency components are small enough that they can be discarded without significantly degrading the video image and even the remaining high frequency components do not have to be transmitted with as much precision as the low frequency components. The higher frequency components are truncated through a process known as quantization, which is described in more detail in the book *MPEG Video Compression Standard*.

Once the 64 frequency components are generated through the DCT, they are encoded in a series of run-level pairs. The 64 frequency components are ordered in increasing frequency as illustrated in FIG. 7. Starting with the first frequency component, each non-zero component is encoded as a run-level pair, where the run represents the number of preceding zero components and the level is the value of the non-zero component. For instance if the first non-zero component is number three and it has a level of −2, the run-level pair would be 3, −2. Because only a few of the frequency components are usually non-zero, only a few run-level pairs are usually necessary to encode a block of data. Moreover, usually only the first few, low frequency components are non-zero so run-level pairs with a run of zero or one are much more common than larger runs.

MPEG takes advantage of the fact that certain run-level pairs are more probable than others by encoding the data stream of run-level pairs using Huffman coding, where the length of the code is inversely proportional to the probability of the code occurring. Thus, the code for a run of zero and a level of one is only two bits long. A run of fourteen and a level of two, which is much less probable, utilizes a sixteen bit code. In practice, run-level pairs beyond the first 100 or so are coded with an escape code sequence because they are so improbable.

In the present embodiment, data is encoded for transmission in the MPEG channel, but is inserted after the lossy compression step. Encoding data after the lossy compression step allows for creation of a selected, deterministic output after decompression by proper encoding of the data. In the present embodiment this is accomplished by encoding the data to be transmitted directly into MPEG Huffman codes. Each Huffman code sequence generates a known output when decoded. Thus, by looking at the video output after decompression, the Huffman code sequence used to create that particular output can be determined and the corresponding original data recovered. The particular codes used are selected to create an output that has easy to distinguish features when subsequently extracting the data.

In the disclosed embodiment of the present invention, only the low frequency components of the video signal are utilized to encode data. These low frequency components are selected because the low frequency components are computationally easier to detect and decode in the video signal on the receiving end and are much more immune to noise. To further ease the decoding step, only a small set of allowed coefficient values are utilized. Thus, of 64 possible frequency components and 256 possible levels, generally only 2–7 coefficients and 1–3 levels are preferably used to encode the data to be transferred.

As an example, if data is to be encoded or mapped into the MPEG stream using 2 coefficients and 3 levels (up to seven values because of sign and zero), there are 49 ($7^2$) possible values per block, allowing approximately 5 bits of data to be encoded per block. Similarly, if 4 coefficients and 2 levels are used, then 625 possible values would result, allowing up to 9 bits to be encoded per block. In general, greater numbers of coefficients and levels improve efficiency and increase bandwidth. However, as the numbers of coefficients and levels increase, so does the difficulty of decoding the data out of the resultant video signal. Regardless of the actual number of levels chosen, the quantization should be adjusted so that the output video signal utilizes most of the available luminance and chrominance range, thereby making discrimination between individual levels easier.

In practice, it is preferred to use less than all of the possible coefficient/level combinations. This is because some of the combinations will result in constructive interference where the video signal exceeds allowed ranges and certain combinations will result in very long bit patterns when encoded in Huffman code sequences. Numerical simulations have indicated, for instance, that for 5 coefficients and 3 levels (16,807 possibilities), the optimum number of combinations to use is around 4,000, making 4,096 a reasonable choice. The Huffman codes sequences for each of the 16,807 combinations are computed and the 4,096 shortest resultant bit sequences are selected from among the 16,807 possibilities to minimize the stream length. Use of significantly more combinations increases the size of the resultant data stream at a greater rate than it increases the data carrying capacity of the data stream because of the increasingly long Huffman codes sequences required. Similarly, use of too few combinations decreases efficiency. With appropriate selection of the number of coefficients and levels, it is possible to exceed 50% efficiency in terms of the number of data bits to MPEG stream bits. Even at 50% efficiency, it can be seen that the disclosed embodiment actually decompresses the data during transmission. It should be noted that any coefficient/level values that are omitted can be watched for in the decoding process to verify the validity of the data and decoding process.

Figure 8:
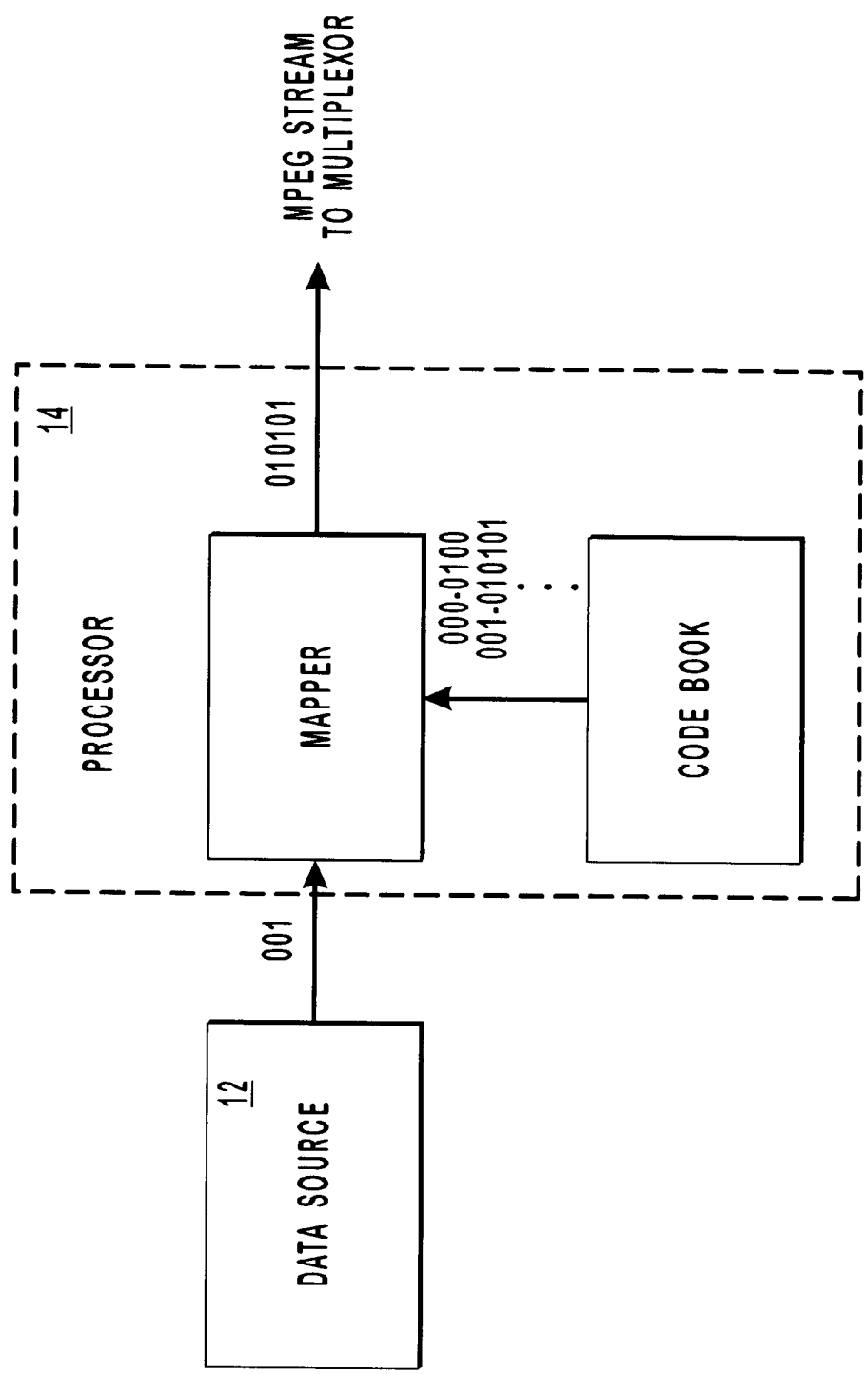
FIG. 8 shows how data is encoded into MPEG format for transmission in the disclosed embodiment.

Thus, the first step in encoding data in an MPEG stream is to select the number of coefficients and levels and to create a mapping or code book relating the $2^N$ possible bit patterns in the N bits of data to be encoded in each MPEG block to the coefficient/level combinations to be used, where N is determined by the number of coefficients and levels. Because all bit combinations are possible, the mapping is typically simply an array of the $2^N$ Huffman code sequences, where the Nbits of the data are used as an index into the array to select the Huffman code sequence corresponding to the Nbits of data. As shown in FIG. 8, once the mapping is created, the data to be sent is simply divided into N-bit pieces, which are mapped into the corresponding Huffman codes for the MPEG block in which the data is embedded.

It is important to note that only non-zero frequency components generate data to be encoded in the MPEG stream. Therefore, the size of the MPEG data stream, and bandwidth required for transmission, will be directly correlated with the number of different frequency components present in the image. This is in contrast to an analog video signal or uncompressed digital video signal, which requires a fixed bandwidth independent of the properties of the video image. One consequence of this difference is that to encode data efficiently in an analog or uncompressed digital video signal, the data encoded must utilize all of the possible frequency components, since any frequencies that are unused represent wasted bandwidth. In an MPEG video stream on the other hand, the efficiency is not tied to use of all of the possible frequency components as the bandwidth scales directly with the components actually present in the signal. Thus, one aspect of the disclosed embodiment of the present invention is the ability to tailor the bandwidth of the signal to the amount of data to be sent. In particular, by selecting the number of coefficients and levels used to encode the data, a wide range of bandwidth can be achieved. Moreover, because the bandwidth required for the MPEG channel scales directly with the number of coefficients used, greater or lesser channel usage, up to full capacity, can be selected by appropriate choice of the number of coefficients.

Figure 9:
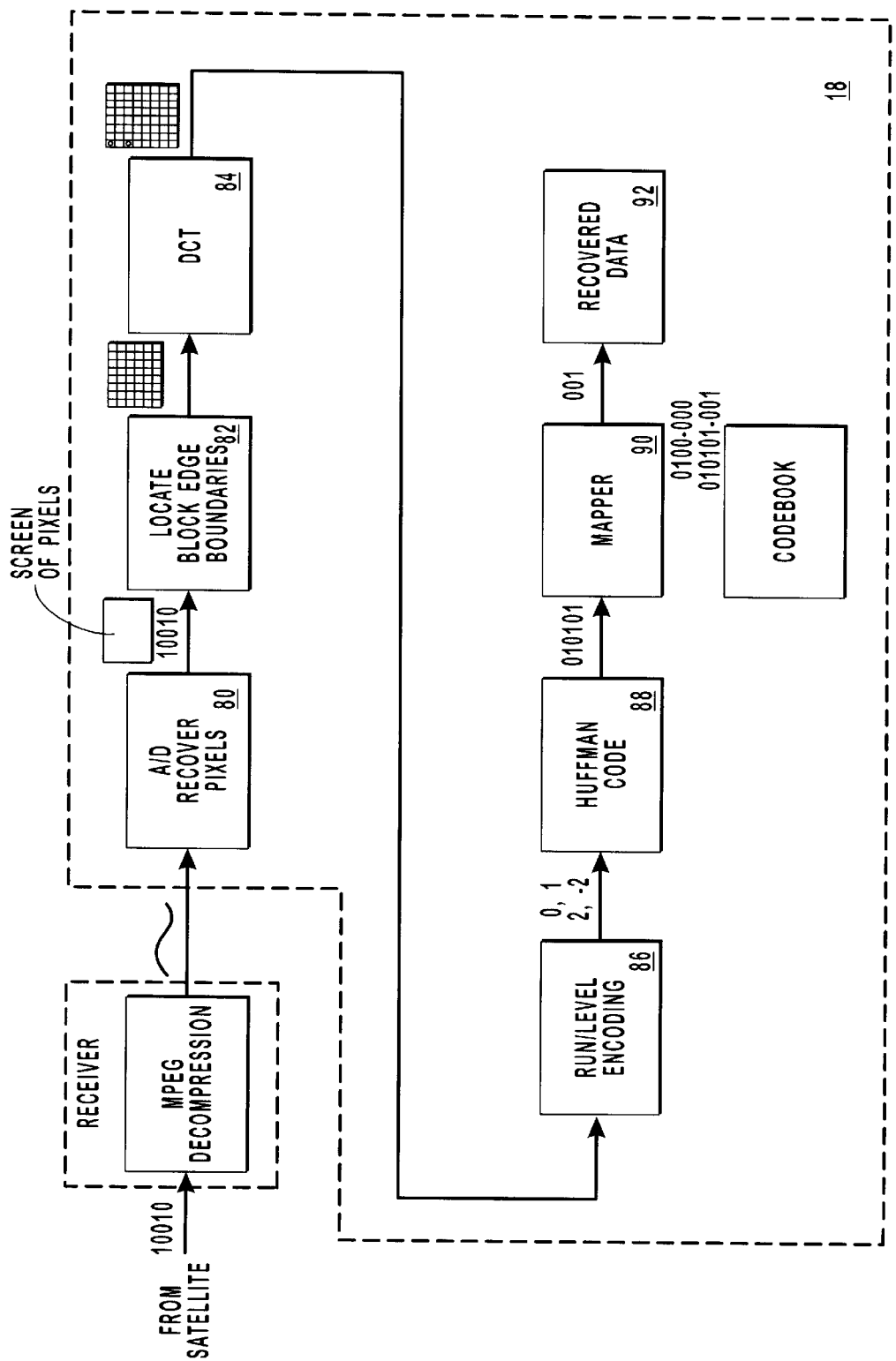
FIG. 9 shows how encoded data is extracted from a video stream.

Once the MPEG stream reaches the digital satellite box, it is converted back to an analog format just as occurs for normal video content, with the output corresponding to the encoded input data. The video content corresponding to the encoded data is re-digitized in the client terminal, as shown at 80 in FIG. 9. The resulting pixel data is processed to locate block edge boundaries using standard pattern recognition techniques at 82. Edge boundary detection is simplified by the fact that use of only low frequency components in the image results in an image where the blocks are relatively distinct from each other, i.e. one 8×8 block may be relatively dark overall, while the adjacent block may be relatively light by virtue of having a different DC frequency coefficient level.

As an alternative, it would also be possible to locate the block boundaries by measuring a predetermined time from the left edge of the screen for each scan line. For instance, the first block may start 10 microseconds after the vertical sync signal. Subsequent blocks would then start intervals of a predetermined number of microseconds defined by the time a scan required to cover one block width.

After the block boundaries are determined the image is divided into 8×8 pixel blocks along those boundaries. As shown at 84, a DCT is applied to these blocks to recover the frequency coefficients and levels, just as occurs in normal MPEG compression. Once the coefficients and levels are recovered, there are numerous ways to extract the original data. For instance, the run-level sequences can be assembled as shown at 86 and translated into corresponding Huffman codes sequences as shown at 88. The original data bits for the particular block will be recovered by locating the Huffman code sequence in the original mapping array/codebook at 90, whereupon the index will represent the original data. Alternatively, an array of coefficient and level sequences can be created, where the index is again Nbits of data which would generate that particular sequence. Thus, by locating the coefficient level sequence for a block, the data for the block is recovered at 92.

It should be understood that the particular mapping or codebook utilized for encoding data must be available on the client for reconstructing the data. The code book could be hardwired into the client or delivered via a modem connection, among numerous other possibilities. Of course, each set of coefficient-level choices will require a different code book because of the different number bits being recovered from each block and the different numbers of coefficients and levels used.

It is also possible to accommodate noisier channels in the transmission of the video signal by choosing less coefficients and levels in which to encode the data. In particular, if only a few levels are used it is easier to discriminate the level of any particular block. Also, the lower frequency components are less affected by slight offsets in block boundaries. Thus, while noise is not a significant problem in client terminals directly connected to a digital satellite receiver, in some cases, the signal may be broadcast over an analog transmission system after, or instead of, the digital transmission. Typically, the client terminal is able to monitor the video signal for some short period of time to determine the number of coefficients and levels used for encoding.

It should be understood that the original digital data to be encoded in the MPEG video stream typically will be compressed using a standard compression algorithm. This is desirable because the MPEG encoding process does not compress the underlying data or take advantage of any patterns present in the data.

Although it is typical to create the MPEG stream directly at processor 14 for direct digital transmission over a satellite network, it is also possible to create a video signal corresponding to the desired MPEG stream. This video signal could then be encoded by an MPEG encoder. By creating a video signal having only low frequency components, such as relied upon for data carrying in the present embodiment, it is possible to tunnel the data through the MPEG compression without degradation.

Using the present invention it is feasible to distribute a much larger quantity of data to client terminals than has previously been possible. For instance, it may be desirable to download the top one hundred web sites to the client terminals to provide improved response time and to avoid the need for a telephone connection when accessing these sites. Similarly, advertisements that are displayed at various times during use of the client terminal could be downloaded in advance to allow additional features in the ads, such as video content, without delaying access to the sites the user is accessing. As another example, the electronic programming guide could be enhanced to provide video clips or previews for various shows.

Downloads would typically occur at night at a pre-established time on some otherwise unused channel. For instance, the client terminal might be configured to set the satellite receiver to channel 23 at 3:00 a.m. for a download. Because no video content is being delivered with the downloaded data, it is typical that television viewing of the download signal be blocked. It should be noted that the client terminal is configured to control the satellite receiver to select the desired channel at the appropriate time. Of course, it is possible that a viewer might be watching TV at the time of the download, in which case the download broadcast might be missed at a particular client terminal. In this event is it possible that the client terminal would be programmed to call over a phone line to obtain some or all of the missed data. The client terminal typically would monitor the usage of the satellite receiver to avoid selecting the downloading channel if it appeared a viewer was watching television.

If video content is to be downloaded and stored, it may be possible to insert sections of actual video content into the digital data stream. Such video segments could then be directly digitized and stored at the client terminals. This would avoid the step of reconstructing a video signal from digital data that is downloaded over a video channel.

Another aspect of the present invention is the interaction of broadcast and telephone downloads. In particular, it is possible, for instance, to download via the broadcast system a user specific code to inform the corresponding client terminal to call in for a telephone download of certain information, such as email or other personalized data. It is also possible for the client terminal to call in for a direct telephone download in the event an error is detected in the broadcast download. Under some circumstances, it may be useful for the client terminal to filter the broadcast information to select only that portion of interest to the user of the client terminal. This might occur in the context of news or stock data, which could be customized to the individual user.

The present embodiment has been described in terms of the low level protocol for transmission. It will be understood that additional higher level layers would normally be provided to allow for error checking and other features.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

What is claimed is:

1. A method of transmitting digital data through an MPEG compressed video channel, comprising:
   providing a set of digital data;
   creating a mapping between the digital data in the set of digital data and MPEG run-level codes;
   creating an MPEG data stream by converting the set of digital data into MPEG run-level codes using the mapping;
   transmitting the MPEG data stream to a remote location;
   generating an analog video signal from the MPEG data stream;
   digitizing the analog video signal; and
   processing the digitized analog video signal to extract the quantity of data.

2. The method of claim 1, wherein the step of processing includes applying a discrete cosine transform to blocks of pixels in the analog video signal to generate frequency coefficient-level pairs and applying an inverse mapping to the frequency coefficients-level pairs to recover the quantity of digital data.

3. The method of claim 1, wherein the mapping utilizes only low frequency coefficients.

4. The method of claim 3, wherein the mapping utilizes less than 10 levels for each frequency coefficient.

5. In a system using lossy compression to distribute digital data, a method for losslessly distributing digital data over a video channel of the system to a plurality of remotely located client terminals, the method comprising the acts of:

providing a set of digital data to be distributed;

encoding the set of digital data in an MPEG formatted data stream compatible with a video broadcast of the system, wherein the set of digital data is inserted after a lossy compression step of the system;

broadcasting the MPEG formatted data stream over the video channel at a predetermined time of the day when no video content is being transmitted over the video channel so that the MPEG formatted stream in which the set of digital data is encoded takes the place of the video content;

receiving the MPEG formatted data stream at the remotely located client terminals; and recovering the set of digital data from the received intermediate format data by performing the acts of:

creating an analog video signal from the MPEG formatted data stream;

digitizing the analog video signal; and extracting the set of digital data from the digitized video signal.

6. The method of claim 5, further comprising saving at least a portion of the set of digital data at the client terminals.

7. The method of claim 6, further comprising displaying information to a user of one of the client terminals, the displayed information corresponding to the saved portion of the set of digital data.

8. The method of claim 7 wherein the set of digital data is chosen from the group consisting of: an electronic programming guide, software, advertisements, web pages and news.

9. The method of claim 5, wherein the act of broadcasting includes transmitting the MPEG formatted data stream over a digital satellite system.

10. The method of claim 9, wherein the act of encoding includes mapping the set of digital data into only low frequency components in the MPEG formatted data stream.

11. The method of claim 5, wherein a preselected number of bits of data from the set of digital data are encoded in each MPEG block of the MPEG formatted data stream.

12. The method of claim 5, further including configuring the client terminal to begin receiving the MPEG formatted data stream at a predetermined time and wherein the act of broadcasting begins at the predetermined time.

13. The method of claim 5, wherein the act of encoding includes the act of creating a mapping between MPEG run-level codes for pixel blocks and digital data bit patterns of predetermined bit length and applying the mapping to pieces of the digital data of the predetermined bit length.

14. The method of claim 13, wherein the act of creating a mapping includes selecting only a subset of coefficients and levels from all possible MPEG coefficients and levels to use in mapping digital data bit patterns.

15. The method of claim 14, wherein the mapping uses only a subset of the possible coefficient and level combinations within the subset of selected coefficients and levels.

16. A method of transmitting digital data over a channel, where all data transmitted over the channel is decompressed at a receiver using MPEG decompression, the method comprising:

encoding data to be transmitted in a form suitable for transmission over the channel by performing at least the steps of:

obtaining a quantity of digital data to be transmitted over the channel;

dividing the digital data into data blocks; and encoding each of the data blocks in a sequence of Huffman codes corresponding to an MPEG pixel block, the encoded sequence being suitable for decoding upon reception at the receiver;

receiving the encoded data by the receiver and using an MPEG decompressor to decompress the received data and produce an analog video signal;

digitizing the analog video signal to identify portions of the analog video signal corresponding to MPEG pixel blocks;

determining MPEG coefficients and levels from the MPEG pixel blocks; and recovering the encoded data by decoding the MPEG coefficients and levels.

17. A method of distributing digital data over a video channel to a plurality of remotely located client terminals, comprising:

providing a set of digital data to be distributed;

converting the set of digital data to an intermediate format data compatible with a video broadcast;

mapping the set of digital data into only low frequency components in the intermediate format data;

broadcasting the intermediate format data over the video channel at a predetermined time of the day when no video content is being transmitted over the video channel so that the intermediate format data takes the place of the video content, wherein the intermediate format data is an MPEG formatted data stream;

transmitting the intermediate format data over a digital satellite system;

receiving the intermediate format data at the remotely located client terminals;

recovering the set of digital data from the received intermediate format;

creating an analog video signal of the intermediate format data; and digitizing the analog video signal and extracting the set of digital data from the digitized video signal.

18. In a client system included in a video broadcast system that also includes a plurality of other client systems, a method of extracting from a video channel a set of digital data that has been encoded and broadcast to the client system in an MPEG format, the method comprising the acts of:

receiving a video channel from the video broadcast system, wherein the video channel includes an MPEG formatted data stream in which a set of digital data has been encoded;

decoding the MPEG formatted data stream to obtain an analog video signal from the MPEG formatted data stream;

digitizing the analog video signal to obtain pixel data; and extracting the set of digital data from the pixel data by performing the acts of:

dividing the pixel data into pixel blocks; and using the frequency coefficients and levels associated with the pixel blocks to recover the set of digital data that has been encoded in the MPEG formatted data stream.

19. The method of claim 18, wherein the act of extracting the set of digital data is conducted by further performing the act of applying a discrete cosine transformation on the pixel blocks.

20. The method of claim 18, wherein the video broadcast system comprises a digital satellite system and the video channel is received by the client system from the digital satellite system.

21. The method of claim 18, wherein the act of dividing the pixel data into data blocks comprises the act of locating boundaries between the pixel blocks using pattern recognition.

22. The method of claim 18, wherein the act of dividing the pixel data into data blocks comprises the act of locating a boundary between the pixel blocks by measuring a predetermined time in the digital pixel data with respect to a left edge of a screen associated with the client system.

23. The method of claim 18, wherein the act of using the frequency coefficients and levels associated with the pixel blocks to recover the set of digital data comprises the act of using the frequency coefficients and levels to access a codebook having indices that represent portions of the set of digital data.

* * * * *